(12) United States Patent
Liang et al.

(10) Patent No.: US 8,618,236 B2
(45) Date of Patent: Dec. 31, 2013

(54) POLYSILOXANE-GRAFTED POLYIMIDE RESIN COMPOSITION AND FLEXIBLE SUBSTRATE MADE THEREFROM

(71) Applicant: Chi Mei Corporation, Tainan (TW)

(72) Inventors: Yu-Hao Liang, Koahsiung (TW); Li-Tao Hsu, Kaohsiung (TW); Huai-Pin Hsueh, Tainan (TW)

(73) Assignee: Chi Mei Corporation, Tainan (TW)

( * ) Notice: Subject to any disclaimer, the term of this patent is extended or adjusted under 35 U.S.C. 154(b) by 0 days.

(21) Appl. No.: 13/725,548

(22) Filed: Dec. 21, 2012

(65) Prior Publication Data

US 2013/0267651 A1   Oct. 10, 2013

(30) Foreign Application Priority Data

Dec. 23, 2011   (TW) .............................. 100148392 A

(51) Int. Cl.
  *C08G 77/455*  (2006.01)
(52) U.S. Cl.
  USPC .................... 528/26; 528/28; 528/29; 528/38
(58) Field of Classification Search
  None
  See application file for complete search history.

(56) References Cited

U.S. PATENT DOCUMENTS

| | | | | |
|---|---|---|---|---|
| 5,473,041 | A | * | 12/1995 | Itoh .................................. 528/26 |
| 6,001,942 | A | * | 12/1999 | Amako et al. ................... 528/10 |
| 8,193,295 | B2 | * | 6/2012 | Sunaga et al. ................... 528/38 |
| 2012/0202117 | A1 | * | 8/2012 | Hirose et al. ................... 429/211 |

FOREIGN PATENT DOCUMENTS

| JP | 1-204931 | * | 8/1989 |
|---|---|---|---|
| JP | 2005-146213 A | | 6/2005 |

OTHER PUBLICATIONS

"Rigid-Rod Polymers with Polysiloxane Side Chains. I. Synthesis and Characterization of Rigid-Rod Polyimides with Polysiloxane Side Chains and their Compatibility with Linear Polysiloxanes" authored by Itoh et al, and published in the Journal of Applied Polymer Science, Part A: Polymer Chemistry (1994) 32, 18, 1581-1592.*

Abstract for the article entitled "Preparation of Oligodimethylsiloxane-grafted poly(amide-imide) Membrane and its Separation Properties of Aqueous Organic Liquid Mixtures by Pervaporation" authored by Akimoto et al. and published in Polymer Journal (2004) 36(8), 587-593.*

* cited by examiner

Primary Examiner — Marc Zimmer
(74) Attorney, Agent, or Firm — Christie, Parker & Hale, LLP

(57) ABSTRACT

A polysiloxane-grafted polyimide resin composition includes a polysiloxane-grafted polyimide resin, and a solvent. The polysiloxane-grafted polyimide resin is represented by Formula (I):

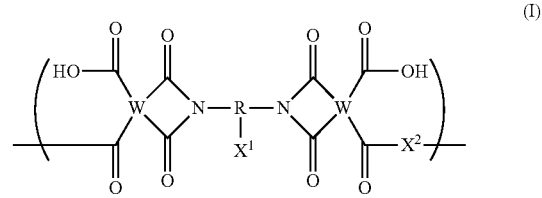

wherein
W represents a tetravalent organic group,
R represents a trivalent organic group, and
$X^1$ and $X^2$ independently represent a polysiloxane-containing group.

15 Claims, No Drawings

POLYSILOXANE-GRAFTED POLYIMIDE RESIN COMPOSITION AND FLEXIBLE SUBSTRATE MADE THEREFROM

CROSS-REFERENCE TO RELATED APPLICATION

This application claims priority of Taiwanese Application No. 100148392, filed on Dec. 23, 2011.

BACKGROUND OF THE INVENTION

1. Field of the Invention

This invention relates to a polyimide resin composition, more particularly to a polysiloxane-grafted polyimide resin composition. This invention also relates to a flexible substrate formed from the polysiloxane-grafted polyimide resin composition.

2. Description of the Related Art

Recently, organic polymer materials have been widely used in various electronic components or devices so as to enhance various characteristics (for example, electrical insulation, heat resistance, mechanical property, etc.) of the electronic components or devices. Among them, polyimide polymer is most widely used in view of good mechanical and electrical properties. However, it is increasingly required to raise the properties and performances of the electronic components or devices in the art. Therefore, the mechanical properties (for example, flexibility, extensibility, etc.), the thermal properties (for example, low thermal expansion coefficient), insulation, or adhesion of polyimide polymer are required to be improved.

Conventionally, the physical properties, especially thermal or mechanical property, of polyimide polymer are modified by adding various reinforcing materials so as to enhance the applicability of polyimide polymer. Commonly used reinforcing materials include titanium dioxide, silicon dioxide, talc, etc. However, such a modification manner has problems in mixing homogeneity and compatibility. Furthermore, a flexible substrate formed therefrom may have a cloudy appearance.

JP2005-146213 discloses a silane modified polyimide siloxane resin composition useful as an adhesive for a printed circuit board. A polyimide siloxane resin containing a carboxyl group and/or an anhydride group is formed by subjecting a tetracarboxylic dianhydride compound, a dihydroxyl siloxane compound, and a diamine compound to a reaction. An epoxy group-containing silane partial condensate is then added. The carboxyl group and/or the anhydride group of the polyimide siloxane resin react with the epoxy group of the silane partial condensate so as to bond the silane partial condensate to the tetracarboxylic dianhydride moiety of the polyimide siloxane resin and to obtain the silane modified polyimide siloxane resin. However, the silane modified polyimide siloxane resin has inferior thermal stability. The silane partial condensate tends to split from the polyimide siloxane resin which results in impaired mechanical and thermal properties of a flexible substrate formed from the silane modified polyimide siloxane resin composition. Therefore, a flexible substrate obtained from the silane modified polyimide siloxane resin composition may not have satisfactory mechanical and thermal properties, especially when being used for a flexible liquid crystal display or a flexible electronic book.

It is desirable in the art to provide a resin composition for forming a flexible substrate having satisfactory mechanical and thermal properties for an electronic device.

SUMMARY OF THE INVENTION

Therefore, a first object of the present invention is to provide a polysiloxane-grafted polyimide resin composition which can be formed into a flexible substrate having superior thermal and mechanical properties.

A second object of the present invention is to provide such a flexible substrate.

According to a first aspect of this invention, there is provided a polysiloxane-grafted polyimide resin composition including:

a polysiloxane-grafted polyimide resin of Formula (I):

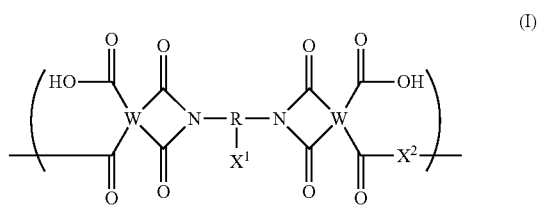

wherein
W represents a tetravalent organic group,
R represents a trivalent organic group, and
$X^1$ and $X^2$ independently represent a polysiloxane-containing group;
and
a solvent.

According to a second aspect of this invention, there is provided a flexible substrate formed from the polysiloxane-grafted polyimide resin composition.

DETAILED DESCRIPTION OF THE PREFERRED EMBODIMENTS

Polysiloxane-grafted Polyimide Resin Composition and Preparation Thereof:

The polysiloxane-grafted polyimide resin composition according to the present invention includes:

a polysiloxane-grafted polyimide resin of Formula (I):

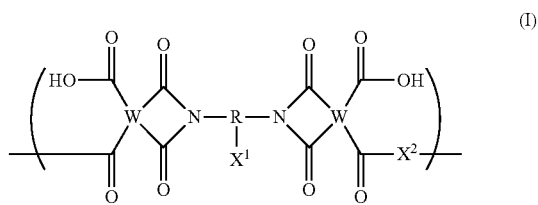

wherein
W represents a tetravalent organic group,
R represents a trivalent organic group, and
$X^1$ and $X^2$ independently represent a polysiloxane-containing group;
and
a solvent.

Examples of the tetravalent organic group include, but are not limited to, a tetravalent aliphatic group, a tetravalent alicyclic group, and a tetravalent aromatic group. Preferably, the tetravalent organic group is selected from

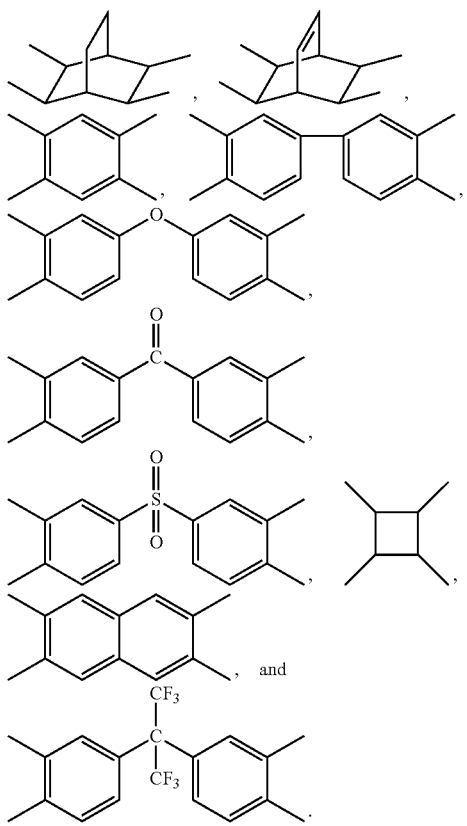

The trivalent organic group is preferably selected from a trivalent aliphatic group, a trivalent alicyclic group, a trivalent aromatic group, and combinations thereof. Any of the organic groups can be optionally substituted by a substituent preferably selected from hydrogen, hydroxyl, halogen, and combinations thereof.

Preferably, $X^1$ is selected from

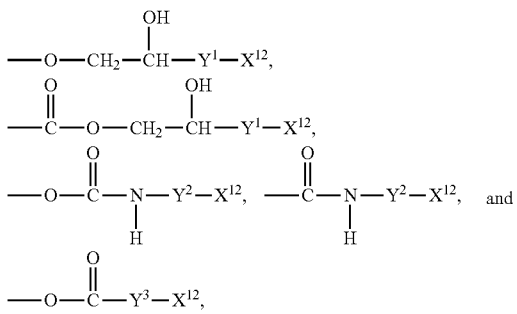

wherein $X^{12}$ represents a polysiloxanyl group, $Y^1$ and $Y^3$ independently represent a substituted or unsubstituted $C_1$-$C_{13}$ alkylene group, a substituted or unsubstituted $C_6$-$C_{12}$ arylene group, or a substituted or unsubstituted $C_7$-$C_{12}$ aralkylene group, and $Y^2$ represents a substituted or unsubstituted $C_1$-$C_{13}$ alkylene group, wherein one or more methylene groups of the alkylene group are optionally replaced by oxygen atoms with the proviso that when more methylene groups are replaced by oxygen atoms, a structure in which two oxygen atoms adjoin together is excluded.

Examples of the substitutes of the substituted $C_1$-$C_{13}$ alkylene group, the substituted $C_6$-$C_{12}$ arylene group, and the $C_7$-$C_{12}$ aralkylene group include, but are not limited to, an alkyl group, aglycidyl group, aglycidyl-containing group, a glycidoxyl group, a glycidoxyl-containing group, a hydroxyl group, and a hydroxyl-containing group.

Examples of the arylene group include, but are not limited to, phenylene, and naphthylene.

Examples of the aralkylene group include, but are not limited to,

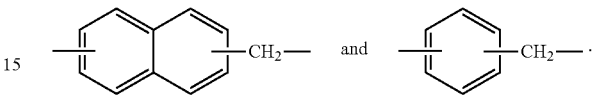

Preferably, $Y^1$ represents a substituted or unsubstituted $C_1$-$C_{13}$ alkylene group.

Preferably, $Y^3$ represents a substituted or unsubstituted $C_6$-$C_{12}$ arylene group.

Preferably, $Y^2$ represents an unsubstituted $C_1$-$C_{13}$ alkylene group.

Preferably, $X^2$ is selected from

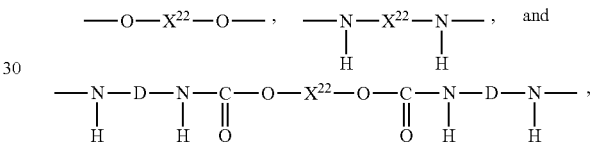

wherein $X^{22}$ represents a polysiloxanyl group, and

D represents

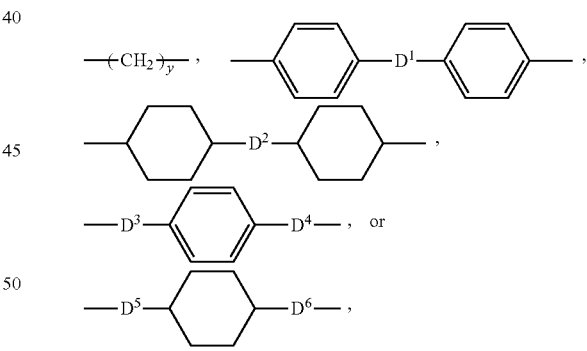

wherein y is an integer ranging from 1 to 10, and $D^1, D^2, D^3, D^4, D^5,$ and $D^6$ independently represent a single bond or a $C_1$-$C_2$ linear alkylene group.

Preferably, the polysiloxanyl group has a silicon content ranging from 0.045 mole to 36 moles based on 1 mole of the polysiloxane-grafted polyimide resin.

Preferably, the polysiloxane-grafted polyimide resin has a molecular weight ranging from 30,000 to 1,000,000.

Preferably, the polysiloxane-grafted polyimide resin composition according to the present invention further includes a polysiloxane-grafted polyamic acid resin of Formula (II):

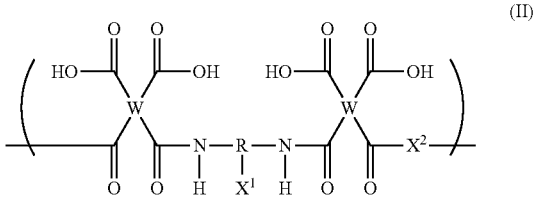

wherein

W, R, $X^1$, and $X^2$ in Formula (II) are as defined in Formula (I).

Preferably, the polysiloxane-grafted polyimide resin of Formula (I) is in an amount not less than 70 wt % based on 100 wt % of a combination of the polysiloxane-grafted polyimide resin of Formula (I) and the polysiloxane-grafted polyamic acid resin of Formula (II).

Preferably, the solvent used in the polysiloxane-grafted polyimide resin composition of the present invention is selected from N-methyl-2-pyrrolidone, γ-butyrolactone, γ-butyrolactam, 4-hydroxy-4-methyl-2-pentanone, ethylene glycol monomethyl ether, butyl lactate, butyl acetate, methyl methoxypropionate, ethyl ethoxypropionate, ethylene glycol methyl ether, ethylene glycol ethyl ether, ethylene glycol n-propyl ether, ethylene glycol isopropyl ether, ethylene glycol n-butyl ether, ethylene glycol dimethyl ether, ethylene glycol ethyl ether acetate, diglycol dimethyl ether, diglycol diethyl ether, diglycol monomethyl ether, diglycol monoethyl ether, diglycol monomethyl ether acetate, diglycol monoethyl ether acetate, N,N-dimethylformamide, N,N-dimethylacetamide, and combinations thereof.

Additives commonly used in the art may be added to the polysiloxane-grafted polyimide resin composition of the present invention as long as the intended properties of the polysiloxane-grafted polyimide resin composition are not impaired. Examples of the additives include, but are not limited to, plasticizers, weathering agents, fillers, viscosity modifiers, surface modifying agents, antioxidants, defoaming agents, coloring agents, heat stabilizers, adhesion promoters, and release agents. The additives can be used alone or in admixture of two or more.

Preferably, the additive is used in an amount ranging from 0.1 part by weight to 40 parts by weight based on 100 parts by weight of the polysiloxane-grafted polyimide resin and the polysiloxane-grafted polyamic acid resin.

Examples of the fillers include, but are not limited to, silicon dioxide (commercially available as IPA-ST (particle size: 12 nm), EG-ST (particle size: 12 nm), IPA-ST-L (particle size: 45 nm), and IPA-ST-ZL (particle size: 100 nm) manufactured by Nissan Chemical Industries, Ltd.), aluminum oxide, talc, calcium carbonate, calcium sulfate, barium sulfate, and titanium dioxide. The fillers can be used alone or in admixture of two or more.

Example of the adhesion promoters include, but are not limited to, 3-glycidoxypropyltrimethoxysilane (commercially available as KBM-403 manufactured by Shin-Etsu Chemical Co., Ltd.), 3-glycidoxypropylmethyldiethoxysilane, and 3-glycidoxypropyltriethoxysilane. The adhesion promoters can be used alone or in admixture of two or more.

Examples of the antioxidants include, but are not limited to, dibutylhydroxytoluene (commercially available as BHT manufactured by TCI) and 2,6-di-tert-butylphenol. The antioxidants can be used alone or in admixture of two or more.

When the fillers are used, the flexible substrate made from the polysiloxane-grafted polyimide resin composition has a lower thermal expansion coefficient.

There is no specific limitation to the method for preparing the polysiloxane-grafted polyimide resin composition of the present invention. For example, the polysiloxane-grafted polyimide resin composition of the present invention can be made using a general mixing method. That is, the polysiloxane-grafted polyimide resin, the polysiloxane-grafted polyamic acid resin, the solvent, and the optional additives are stirred using a stirrer until a homogeneous mixture is obtained.

The viscosity of the polysiloxane-grafted polyimide resin composition of the present invention can be adjusted according to the specific coating method to be used. Preferably, the viscosity ranges from 1 cp to 20,000 cps.

Preparation of Polysiloxane-Grafted Polyimide Resin:

Preferably, the polysiloxane-grafted polyimide resin is obtained by a process including the steps of:

(a) subjecting a tetracarboxylic dianhydride component of formula

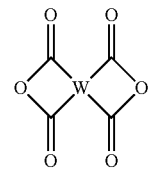

and a siloxane component to a ring-opening reaction,
wherein
W is as defined in Formula (I);

(b) adding a diamine component including a diamine compound of formula

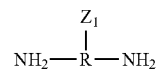

to conduct a polymerization reaction followed by a dehydration/ring-closure reaction to form a polymerization reaction product of formula

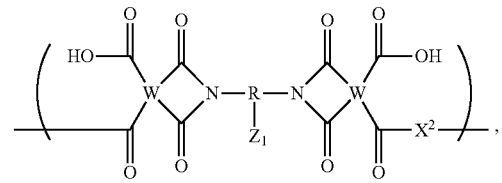

wherein

W, R, and $X^2$ are as defined in Formula (I), and $Z_1$ is a monovalent group; and (c) subjecting the polymerization reaction product and a polysiloxane containing a group $Z_2$ to a reaction to produce the polysiloxane-grafted polyimide resin, wherein $X^1$ is as defined in Formula (I), and $Z_2$ is a monovalent group reactive with $Z_1$ to undergo said reaction.

Specifically, the anhydride group of the tetracarboxylic dianhydride component and a terminal reactive group of the siloxane component are subjected to a ring-opening reaction. Then the remaining anhydride groups and the amino groups of the diamine compound are subjected to the polymerization reaction followed by the dehydration/ring-closure reaction to form the polymerization reaction product. The reactive group ($Z_1$) of the polymerization reaction product and the reactive group ($Z_2$) of the polysiloxane are reacted with each other to produce the polysiloxane-grafted polyimide resin.

Preferably, the total amount of the siloxane component and the diamine component ranges from 0.8 mole to 1 mole based on 1 mole of the tetracarboxylic dianhydride component. The siloxane component is used in an amount ranging from 1 wt % to 70 wt % based on 100 wt % of a combination of the tetracarboxylic dianhydride component, the siloxane component, and the diamine component.

The operating conditions of the ring-opening reaction, e.g., the reaction temperature and the reaction period, can be those commonly used in the art. Preferably, the ring-opening reaction is conducted at a temperature ranging from 80° C. to 160° C. for a period ranging from 0.5 hour to 5 hours.

The operating conditions of the polymerization reaction and the dehydration/ring-closure reaction, e.g., the reaction temperature and the reaction period, can be those commonly used in the art. Preferably, the polymerization is conducted at a temperature ranging from 0° C. to 100° C. for a period ranging from 1 hour to 24 hours. Preferably, the dehydration/ring-closure reaction is conducted at a temperature ranging from 30° C. to 200° C. Preferably, the dehydration/ring-closure reaction is conducted for a period ranging from 0.5 to 50 hours.

There is no particular limitation to the solvent for the polymerization reaction as long as the solvent is able to dissolve the reactants and the products. Preferably, examples of the solvent include, but are not limited to, aprotic polar solvents, such as N-methyl-2-pyrrolidone, N,N-dimethylacetamide, N,N-dimethylformamide, dimethylsulfoxide, γ-butyrolactone, tetramethylurea, hexamethylphosphoric acid triamide, and the like; and phenolic solvents, such as meta-cresol, xylenol, phenol, halogenated phenols, and the like.

Preferably, the dehydration/ring-closing reaction is implemented by heating in the presence of a dehydrating agent and an imidization catalyst so as to convert the amic acid functional group produced in the polymerization reaction to the amide functional group (i.e., an imidization reaction).

When the imidization degree of polyamic acid is larger than 70%, the flexible substrate formed from the polysiloxane-grafted polyimide resin composition has better thermal and mechanical properties.

The dehydrating agent suitable for the dehydration/ring-closing reaction is selected from an acid anhydride compound, such as acetic anhydride, propionic anhydride, trifluoroacetic anhydride, and the like. The dehydrating agent is preferably used in an amount ranging from 0.01 mole to 20 moles based on 1 mole of the polyamic acid. The imidization catalyst suitable for the dehydration/ring-closing reaction is selected from pyridine compounds, such as pyridine, trimethylpyridine, dimethylpyridine, or the like; and tertiary amines, such as triethylamine, or the like. The imidization catalyst is preferably used in an amount ranging from 0.5 mole to 10 moles based on 1 mole of the dehydrating agent.

Preferably, the aforesaid reaction of the polymerization reaction product containing the group $Z_1$ with the polysiloxane containing to group $Z_2$ is conducted under heating condition with presence of a catalyst. Examples of the catalyst include, but are not limited to, (1) tertiary amine compounds, such as 1,8-diaza-bicyclo[5,4,0]-7-undecene, triethylenediamine, dimethyl benzyl amine, triethanolamine, dimethylethanolamine, and tris(dimethylaminomethyl)phenol; (2) imidazole compounds, such as 2-methyl imidazole, 2-phenylimidazole, 2-phenyl-4-methyl imidazole, 2-heptadecylimidazole, and benzimidazole; (3) organic phosphine compounds, such as tributylphosphine, methyl diphenyl phosphine, triphenylphosphine, diphenylphosphine, and phenylphosphine; and (4) tetraphenylborate compounds, such as tetraphenylphosphonium tetraphenylborate, 2-ethyl-4-methylimidazole tetraphenylborate, and N-methylmorpholine tetraphenylborate.

There is no particular limitation to the solvent used in the reaction of the polymerization reaction product containing the group $Z_1$ with the polysiloxane containing the group $Z_2$ as long as the solvent is able to dissolve the polymerization reaction product, the polysiloxane, and the product formed thereby. Examples of the solvents include, but are not limited to, aprotic polar solvents, such as N-methyl-2-pyrrolidone, N,N-dimethylacetamide, N,N-dimethylformamide, dimethylsulfoxide, γ-butyrolactone, tetramethylurea, hexamethylphosphoric acid triamide, and the like; and phenolic solvents, such as meta-cresol, xylenol, phenol, halogenated phenols, and the like.

The aforesaid reaction of the polymerization reaction product with the polysiloxane is conducted at a temperature ranging preferably from 50° C. to 120° C., and more preferably from 60° C. to 100° C. The reaction is conducted in a period ranging preferably from 0.5 to 8 hours, and more preferably from 1 to 7 hours.

Preferably, the equivalent ratio of the $Z_2$ group of the polysiloxane to the $Z_1$ group of the polymerization reaction product ranges from 0.01 to 0.4.

Preparation of Polysiloxane-Grafted Polyamic Acid Resin:

Preferably, the polysiloxane-grafted polyamic acid resin of Formula (II) is obtained by a process including the steps of:

(1) subjecting the aforesaid tetracarboxylic dianhydride component and the aforesaid siloxane component to a ring-opening reaction;

(2) adding the aforesaid diamine component to conduct a polymerization reaction to form a polymerization reaction product having the aforesaid monovalent $Z_1$ group; and (3) subjecting the polymerization reaction product and the aforesaid polysiloxane to a reaction to produce the polysiloxane-grafted polyamic acid resin.

The polymerization reaction can be controlled by adjusting the reaction temperature and/or the reaction period so that the polymerization reaction product obtained thereby may contain the polysiloxane-grafted polyamic acid resin, the polysiloxane-grafted polyimide resin, or a mixture thereof.

Tetracarboxylic Dianhydride Component:

Examples of the tetracarboxylic dianhydride component suitable for the present invention include, but are not limited to, aliphatic tetracarboxylic dianhydride, alicyclic tetracarboxylic dianhydride, and aromatic tetracarboxylic dianhydride. These teracarboxylic dianhydride compounds may be used alone or in admixture of two or more.

Examples of aliphatic tetracarboxylic dianhydride include, but are not limited to, ethanetetracarboxylic dianhydride, and butanetetracarboxylic dianhydride. Examples of the aliphatic tetracarboxylic dianhydride may be used alone or in admixture of two or more.

Examples of alicyclic tetracarboxylic dianhydride include, but are not limited to, 1,2,3,4-cyclobutanetetracarboxylic dianhydride, 1,2-dimethyl-1,2,3,4-cyclobutanetetracarboxylic dianhydride, 1,3-dimethyl-1,2,3,4-cyclobutanetetracarboxylic dianhydride, 1,3-dichloro-1,2,3,4-cyclobutanetetracarboxylic dianhydride, 1,2,3,4-tetramethyl-1,2,3,4-cyclobutanetetracarboxylic dianhydride, 1,2,3,4- cyclopentanetetracarboxylic dianhydride, 1,2,4,5-cyclohexanetetracarboxylic dianhydride, 3,3',4,4'-dicyclohexanetetracarboxylic dianhydride, cis-3,7-dibutylcycloheptyl-1,5-diene-1,2,5,6-tetracarboxylicdianhydride, 2,3,5-tricarboxylcyclopentylacetic dianhydride, and bicyclo[2.2.2]-octa-7-ene-2,3,5,6-tetracarboxylic dianhydride. The alicyclic tetracarboxylic dianhydride may be used alone or in admixture of two or more.

Examples of aromatic tetracarboxylic dianhydride include, but are not limited to, 3,4-dicarboxy-1,2,3,4-tetrahydronaphthalene-1-succinic acid dianhydride, pyromellitic dianhydride, 3,3',4,4'-benzophenonetetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3'-4,4'-biphenylethanetetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furantetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropylidenediphthalic dianhydride, 3,3',4,4'-diphenyltetracarboxylic dianhydride, bis(phthalic acid)phenylphosphine oxide dianhydride, p-phenylene-bis(triphenylphthalic acid) dianhydride, m-phenylene-bis(triphenylphthalic acid) dianhydride, bis(triphenylphthalic acid)-4,4'-diphenylether dianhydride, bis(triphenylphthalic acid)-4,4'-diphenylmethane dianhydride, ethylene glycol-bis(anhydrotrimellitate), propylene glycol-bis(anhydrotrimellitate), 1,4-butanediol-bis(anhydrotrimellitate), 1,6-hexanediol-bis(anhydrotrimellitate), 1,8-octanediol-bis(anhydrotrimellitate), 2,2-bis(4-hydroxyphenyl)propane-bis(anhydrotrimellitate), 2,3,4,5-tetrahydrofurantetracarboxylicdianhydride, 1,3,3a,4,5,9b-hexahydro-5-(tetrahydro-2,5-dioxo-3-furanyl)-naphtho[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-di oxo-3-furanyl)-naphtho[1,2-c]-furan-1,3,-dione, 1,3,3a,4,5,9b-hexahydro-7-ethyl-5-(tetrahydro-2,5-dioxo-3-furanyl)-naphtho[1,2-c]-furan-1,3,-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione, 1,3,3a,4,5,9b-hexahydro-5,8-dimethyl-5-(tetrahydro-2,5-dioxo-3-furanyl)-naphtho[1,2-c]-furan-1,3-dione, and 5-(2,5-dioxotetrahydrofuranyl)-3-methyl-3-cyclohexene-1,2-dicarboxylic dianhydride. The aromatic tetracarboxylic dianhydride may be used alone or in admixture of two or more.

In addition to the aforesaid examples of the tetracarboxylic dianhydride, other examples of the tetracarboxylic dianhydride useful for the present invention include the compounds represented by the following Formulas (i-1)-(i-6):

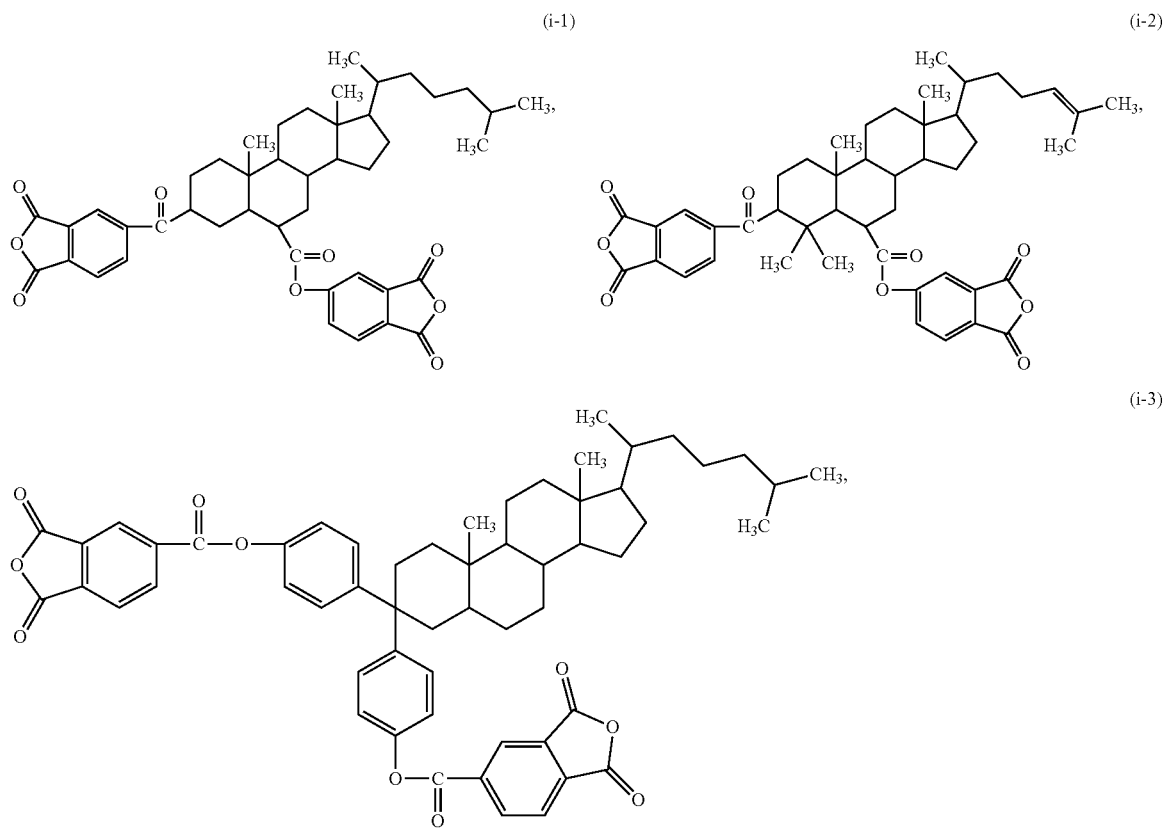

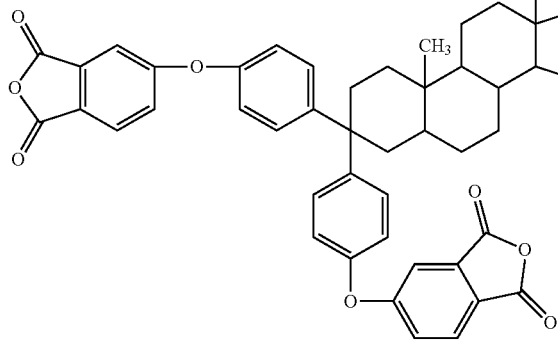

(i-4)

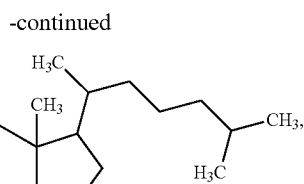

(i-5)

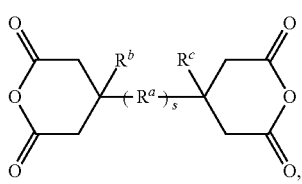

(i-6)

wherein $R^a$ represents a divalent group having an aromatic ring structure; s represents an integer ranging from 1 to 2; and $R^b$ and $R^c$ independently represent hydrogen or an alkyl group, and

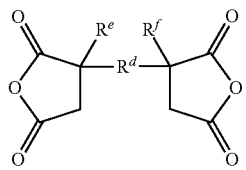

wherein $R^d$ represents a divalent group having an aromatic ring structure; and $R^e$ and $R^f$ independently represent hydrogen or an alkyl group.

Preferably, the tetracarboxylic dianhydride represented by Formula (i-5) is selected from

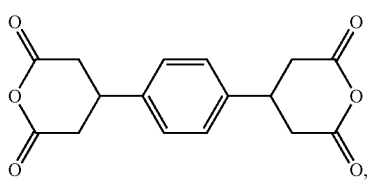

(i-5-1)

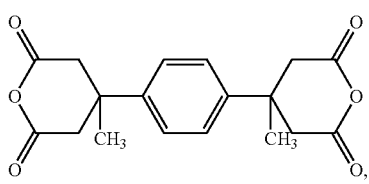

(i-5-2)

and

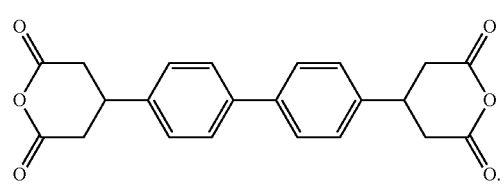

(i-5-3)

Preferably, the tetracarboxylic dianhydride represented by Formula (i-6) is

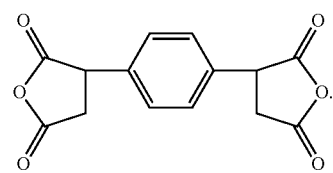

(i-6-1)

Preferably, the tetracarboxylic dianhydride component suitable for the present invention is selected from 1,2,3,4-cyclobutanetetracarboxylic dianhydride, 1,2,3,4-cyclopentanetetracarboxylic dianhydride, 2,3,5-tricarboxycyclopentylacetic dianhydride, 3,4-dicarboxy-1,2,3,4-tetrahydronaphthalene-1-succinic acid dianhydride, pyromellitic dianhydride, 3,3',4,4'-benzophenonetetracarboxylic dianhydride, 3,3',4,4'-diphenylsulfonetetracarboxylic dianhydride, and combinations thereof.

Siloxane Component

The siloxane component is selected from a group consisting of a siloxane compound containing a terminal hydroxyl group, a siloxane compound containing a terminal amino group, a siloxane compound containing a terminal isocyanato group, and combinations thereof.

The terminal hydroxyl group, the terminal amino group, or the terminal isocyanato group of the siloxane component and the anhydride group of the tetracarboxylic dianhydride component are subjected to a ring-opening reaction.

The siloxane compound containing a terminal hydroxyl group is denoted by Formula (III):

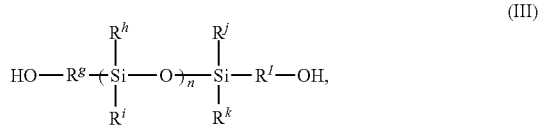

(III)

wherein $R^g$ and $R^l$ independently represent a $C_1$-$C_6$ alkylene group or a $C_1$-$C_6$ phenylene group;

$R^h$-$R^k$ independently represent a $C_1$-$C_4$ alkyl group or a phenyl group; and n is an integer ranging from 3 to 30.

Examples of the siloxane compound containing a terminal hydroxyl group include, but are not limited to, α,ω-di(2-hydroxylethyl)polydimethylsiloxane, α,ω-di(3-hydroxylpropyl)polydimethylsiloxane (commercially available as DK X8-8579-4 manufactured by Dow Corning Asia), α,ω-di(4-hydroxylbutyl)polydimethylsiloxane, α,ω-di(5-hydroxylpentyl)polydimethylsiloxane, α,ω-di(3-(2-hydroxyphenyl)propyl)polydimethylsiloxane, and α,ω-di(3-(4-hydroxylphenyl)propyl)polydimethylsiloxane (commercially available as X-22-1906 manufactured by Shin-Etsu Chemical Co., Ltd.; IM-11 and IM15 manufactured by Wacker Asahikasei Silicone Co., Ltd.; and the like).

Preferably, the siloxane compound containing a terminal hydroxyl group is selected from α,ω-di(2-hydroxylethyl)polydimethylsiloxane, α,ω-di(3-hydroxylpropyl)polydimethylsiloxane, α,ω-di(3-(4-hydroxylphenyl)propyl)polydimethylsiloxane, and combinations thereof. The siloxane compound containing a terminal hydroxyl group can be used alone or in admixture of two or more.

The siloxane compound containing a terminal amino group is denoted by Formula (IV):

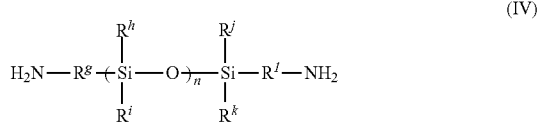

(IV)

wherein $R^g$, $R^l$, $R^h$-$R^k$, and n are as defined in Formula (III).

Examples of the siloxane compound containing a terminal amino group include, but are not limited to, α,ω-di(2-aminoethyl)polydimethylsiloxane, α,ω-di(3-aminopropyl)polydimethylsiloxane (commercially available as KF-8010 manufactured by Shin-Etsu Chemical Co., Ltd.), α,ω-di(4-aminobutyl)polydimethylsiloxane, α,ω-di(5-aminopentyl)polydimethylsiloxane, α,ω-di(3-(2-aminophenyl)propyl)polydimethylsiloxane, and α,ω-di(3-(4-aminophenyl)propyl)polydimethylsiloxane. Preferably, the siloxane compound containing a terminal amino group is selected from α,ω-di(2-aminoethyl)polydimethylsiloxane, α,ω-di(3-aminopropyl)polydimethylsiloxane, α,ω-di(3-(2-aminophenyl)propyl)polydimethylsiloxane, and combinations thereof. The siloxane compound containing a terminal amino group can be used alone or in admixture of two or more.

The siloxane compound containing a terminal isocyanato group is selected from a compound of Formula (V-1), a compound of Formula (V-2), and a combination thereof:

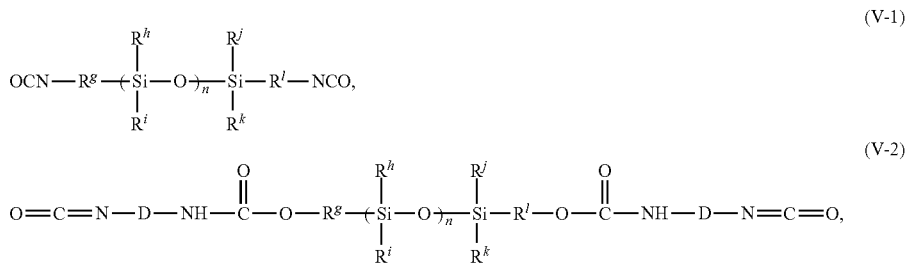

wherein
$R^g$, $R^l$, $R^h$-$R^k$, and n are as defined in Formula (III);
D denotes

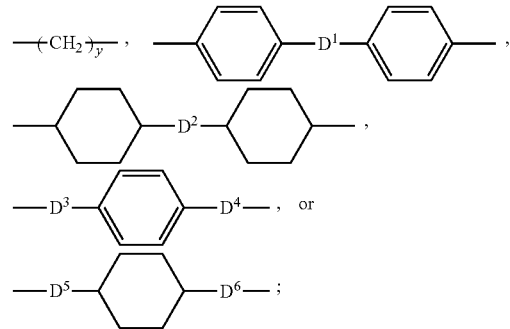

y denotes an integer ranging from 1 to 10; and
$D^1$-$D^6$ independently denote a single bond, or a $C_1$-$C_2$ linear alkylene group.

Examples of the siloxane compound containing a terminal isocyanato group of Formula (V-1) include, but are not limited to, α,ω-di(2-isocyanatoethyl)polydimethylsiloxane, α,ω-di(3-isocyanatopropyl)polydimethylsiloxane, α,ω-di(4-isocyanatobutyl)polydimethylsiloxane, α,ω-di(5-isocyanatopentyl)polydimethylsiloxane, α,ω-di(3-(2-isocyanatophenyl)propyl)polydimethylsiloxane, and α,ω-di(3-(4-isocyanatophenyl)propyl)polydimethylsiloxane. Preferably, the siloxane compound containing a terminal isocyanato group of Formula (V-1) is selected from α,ω-di(2-isocyanatoethyl)polydimethylsiloxane, α,ω-di(3-isocyanatopropyl)polydimethylsiloxane, α,ω-di(3-(2-isocyanatophenyl)propyl)polydimethylsiloxane, and combinations thereof. The siloxane compound containing a terminal isocyanato group of Formula (V-1) can be used alone or in admixture of two or more.

The siloxane compound containing a terminal isocyanato group of Formula (V-2) can be obtained by reacting a diisocyanate compound with the siloxane compound containing a terminal hydroxyl group of Formula (III). The siloxane compound containing a terminal isocyanato group of Formula (V-2) can be used alone or in admixture of two or more.

Examples of the diisocyanate compound include, but are not limited to, (1) aryl diisocyanate compounds, such as p-phenylene diisocyanate, p-xylylene diisocyanate, 1,4-phenylenebisethylene-diisocyanate, 4,4'-biphenylene diisocyanate, diphenylmethane-4,4'-diisocyante, [ethylenebis(p-phenylene)]diisocyanate, or the like; (2) alicyclic diisocyanate compounds, such as 1,4-cyclohexyl diisocyanate, 1,4-bis(isocyanatomethyl)cyclohexane, 1,1'-bicyclohexane-4,4'-diyl-diisocyanate, 4,4'-bicyclohexane-1,1'-diyl-bismethylenediisocyanate, (4,4'-methylenebicyclohexyl)diisocyanate, or the like; and (3) aliphatic diisocyanate compounds, such as diisocyanatomethane, 1,2-ethyldiisocyanate, 1,3-propyldiisocyanate, 1,4-butyldiisocyanate, 1,5-pentyldiisocyanate, 1,6-hexyldiisocyanate, 1,7-heptyldiisocyanate, 1,8-octyldiisocyanate, 1,9-nonyldiisocyanate, 1,10-decyldiisocyanate, or the like. Preferably, the diisocyanate compound is selected from p-phenylene diisocyanate, p-xylylene diisocyanate, diphenylmethane-4,4'-diisocyante, 1,4-cyclohexyl diisocyanate, 1,6-hexyldiisocyanate, and combinations thereof.

The Diamine Component:

The diamine component includes a diamine compound of formula

wherein R represents a trivalent organic group, and $Z_1$ is a monovalent group. Examples of the diamine compound of

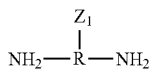

suitable for the present invention include, but are not limited to, aliphatic diamine compounds containing the group $Z_1$, alicyclic diamine compounds containing the group $Z_1$, and aromatic diamine compounds containing the group $Z_1$. These diamine compounds containing the group $Z_1$ may be used alone or in admixture of two or more. Preferably, the $Z_1$ group contained in the diamine compound of formula

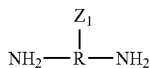

is carboxyl or hydroxyl.

Preferably, the diamine compound of formula

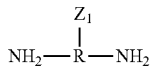

is selected from a compound of Formula (ii-1), a compound of Formula (ii-2), and a combination thereof.

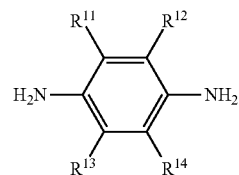

wherein $R^{11}$, $R^{12}$, $R^{13}$, and $R^{14}$ independently represent hydrogen, carboxyl, or hydroxyl with the proviso that $R^{11}$, $R^{12}$, $R^{13}$, and $R^{14}$ may not be hydrogen at the same time. Preferably, the diamine compound of formula (ii-1) is selected from 2-hydroxyl-p-diaminobenzene, 2-carboxyl-p-diaminobenzene, 2,5-dihydroxyl-p-diaminobenzene, 2,5-dicarboxyl-p-diaminobenzene, and the like.

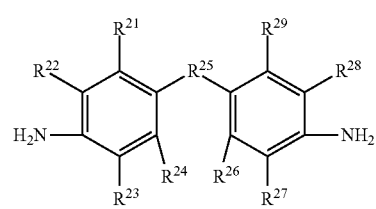

wherein $R^{21}$, $R^{22}$, $R^{23}$, $R^{24}$, $R^{26}$, $R^{27}$, $R^{28}$, and $R^{29}$ independently represent hydrogen, methyl, carboxyl, or hydroxyl with the proviso that at least one of $R^{21}$, $R^{22}$, $R^{23}$, $R^{24}$, $R^{26}$, $R^{27}$, $R^{28}$, and $R^{29}$ is carboxyl or hydroxyl, and wherein $R^{25}$ represents a single bond, —O—, —S—, —CH$_2$—,

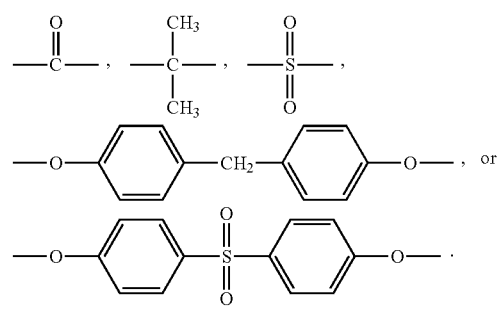

Preferably, the diamine compound of Formula (ii-2) is selected from 3,3'-dihydroxyl-4-4'-diaminobiphenyl, 2,2'-dihydroxyl-4,4'-diamino-5,5'-dimethylbiphenyl, 3,3'-dihydroxyl-4,4'-diaminodiphenylmethane, 1,1'-bis(4-(3-hydroxyl-4-aminophenoxy)phenyl)methane, 3,3'-dihydroxyl-4,4'-diaminodiphenylpropane, 3,3'-dihydroxyl-4,4'-diaminobenzophenone, 3,3'-dihydroxyl-4,4'-diaminodiphenyl ether, 3,3'-dihydroxyl-4,4'-diaminodiphenyl sulfone, bis(4-(3-hydroxyl-4-aminophenoxy)phenyl)sulfone, 3,3'-dihydroxyl-4,4'-diaminodiphenylsulfide, 3,3'-dicarboxyl-4,4'-diaminobiphenyl, 2,2'-dicarboxyl-4,4'-diaminobiphenyl, 2,3'-dicarboxyl-4,4'-diaminobiphenyl, 3,3'-dicarboxyl-4,4'-diaminodiphenylmethane, 3,3'-dicarboxyl-4,4'-diamino-5,5'-dimethyldiphenylmethane, 3,3'-dicarboxyl-4,4'-diaminodiphenylpropane, 3,3'-dicarboxyl-4,4'-diaminobenzophenone, 3-carboxyl-4,4'-diaminodiphenyl ether, 3,3'-dicarboxyl-4,4'-diaminodiphenyl ether, 3,3'-dicarboxyl-4,4'-diaminodiphenyl sulfone, 3,3'-dicarboxyl-4,4'-diaminodiphenyl sulfide, and combinations thereof.

Preferably, the diamine compound of formula

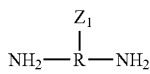

is selected from 2-hydroxyl-p-diaminobenzene, 2-carboxyl-p-diaminobenzene, 2,5-dicarboxyl-p-diaminobenzene, 3,3'-dihydroxyl-4,4'-diaminobiphenyl, 3,3'-dihydroxyl-4,4'-diaminodiphenylmethane, 3,3'-dihydroxyl-4,4'-diaminodiphenyl ether, 3,3'-dicarboxyl-4,4'-diaminobiphenyl, 3,3'-dicarboxyl-4,4'-diaminodiphenylpropane, 3,3'-dicarboxyl-4,4'-diaminodiphenyl ether, and combinations thereof.

Further diamine compounds other than the aforesaid diamine compound may be used in combination with the diamine compounds as long as the intended properties of the polysiloxane-grafted polyimide resin composition of the present invention are not impaired.

Examples of the further diamine compounds suitable for the present invention include, but are not limited to, aliphatic diamine compounds, alicyclic diamine compounds, and aromatic diamine compounds. These further diamine compounds may be used alone or in admixture of two or more.

Examples of the aliphatic diamine compounds include, but are not limited to, 1,2-diaminoethane, 1,3-diaminopropane, 1,4-diaminobutane, 1,5-diaminopentane, 1,6-diaminohexane, 1,7-diaminoheptane, 1,8-diaminooctane, 1,9-diaminononane, 1,10-diaminodecane, 4,4'-diaminoheptane, 1,3-diamino-2,2-dimethylpropane, 1,6-diamino-2,5-dimethylhexane, 1,7-diamino-2,5-dimethylheptane, 1,7-diamino-4,4-dimethylheptane, 1,7-diamino-3-methylheptane, 1,9-diamino-5-methylnonane, 2,11-diaminododecane, 1,12-diaminooctadecane, and 1,2-bis(3-aminopropoxy)ethane. These aliphatic diamine compounds may be used alone or in admixture of two or more.

Examples of the alicyclic diamine compounds include, but are not limited to, 4,4'-diaminodicyclohexylmethane, 4,4'-diamino-3,3'-dimethyldicyclohexylamine, 1,3-diaminocyclohexane, 1,4-diaminocyclohexane, isophoronediamine, tetrahydrodicyclopentadienylene diamine, tricyclic[6.2.1.0$^{2,7}$]-undecylenedimethylene diamine, and 4,4'-methylenebis(cyclohexylamine). These alicyclic diamine compounds may be used alone or in admixture of two or more.

Examples of the aromatic diamine compounds include, but are not limited to, 4,4'-diaminodiphenylmethane, 4,4'-diaminodiphenylethane, 4,4'-diaminodiphenylsulfone, 4,4'-diaminodiphenylether, 3,4'-diaminodiphenylether, 4,4'-diaminobenzanilide, 1,5-diaminonaphthalene, 5-amino-1-(4'-aminophenyl)-1,3,3-trimethylindane, 6-amino-1-(4'-aminophenyl)-1,3,3-trimethylindane, hexahydro-4,7-methanoindanylenedimethylene diamine, 3,3'-diaminobenzophenone, 3,4'-diaminobenzophenone, 4,4'-diaminobenzophenone, 2,2-bis[4-(4-aminophenoxy)phenyl]propane, 2,2-bis[4-(4-aminophenoxy)phenyl]hexafluoropropane, 2,2-bis(4-aminophenyl)hexafluoropropane, 2,2-bis[4-(4-aminophenoxy)phenyl]sulfone, 1,4-bis(4-aminophenoxy)benzene, 1,3-bis(4-aminophenoxy)benzene, 1,3-bis(3-aminophenoxy)benzene, 9,9-bis(4-aminophenyl)-10-hydroanthracene, 9,10-bis(4-aminophenyl)anthracene, 2,7-diaminofluorene, 9,9-bis(4-aminophenyl)fluorene, 4,4'-methylene-bis-(2-chloroaniline), 4,4'-(p-phenyleneisopropylidene)bisaniline, 4,4'-(m-phenyleneisopropylidene)bisaniline, 2,2'-bis[4-(4-amino-2-trifluoromethylphenoxy)phenyl]hexafluoropropane, 4,4'-bis[(4-amino-2-trifluoromethyl)phenoxy]octafluorobiphenyl, 5-[4-(4-n-pentylcyclohexyl)cyclohexyl]phenylmethylene-1,3-diaminobenzene, and 1,1-bis[4-4-aminophenoxy)phenyl]-4-(4-ethylphenyl)cyclohexane. These aromatic diamine compounds may be used alone or in admixture of two or more.

In addition to the aforesaid examples of the further diamine compounds, the further diamine compounds useful for the present invention include the compounds represented by the following Formulas (ii-3)-(ii-17):

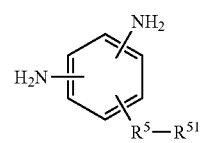

wherein $R^5$ represents —O—, —COO—, —OCO—, —NHCO—, —CONH—, or —CO—; $R^{51}$ represents a monovalent group having a group selected from the group consisting of a steroid skeleton, a trifluoromethyl group, a fluoro group, a $C_2$-$C_{30}$ alkyl group, and a monovalent nitrogen-containing cyclic structure derived from the group consisting of pyridine, pyrimidine, triazine, piperidine and piperazine,

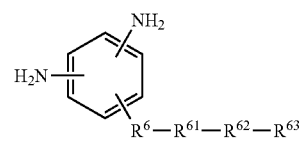

wherein $R^6$ represents —O—, —COO—, —OCO—, —NHCO—, —CONH—, or —CO—; $R^{61}$ and $R^{62}$ respectively represent a divalent group which is selected from the group consisting of an alicyclic group, an aromatic group, and a heterocyclic group, and which is optionally substituted by, for example, halo; $R^{63}$ represents a $C_3$-$C_{18}$ alkyl group, a $C_3$-$C_{18}$ alkoxy group, a $C_1$-$C_5$ fluoroalkyl group, a $C_1$-$C_5$ fluoroalkoxy group, a cyano group, or a halogen atom,

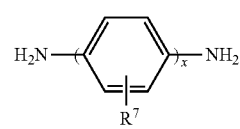

wherein $R^7$ represents hydrogen, a $C_1$-$C_5$ acyl group, a $C_1$-$C_5$ alkyl group, a $C_1$-$C_5$ alkoxy group, or halogen; $R^7$ in each repeating unit may be the same or different; and x is an integer ranging from 1 to 3,

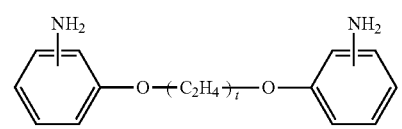

wherein t is an integer ranging from 2 to 12,

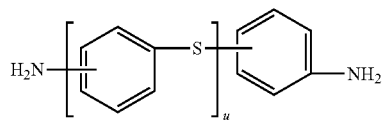
(ii-7)

wherein u is an integer ranging from 1 to 5,

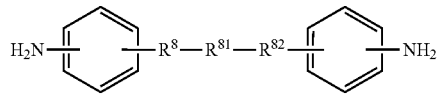
(ii-8)

wherein $R^8$ and $R^{82}$ may be the same or different, and respectively represent a divalent organic group; and $R^{81}$ represents a divalent group that has a ring structure containing a nitrogen atom and that is derived from the group consisting of pyridine, pyrimidine, triazine, piperidine and piperazine,

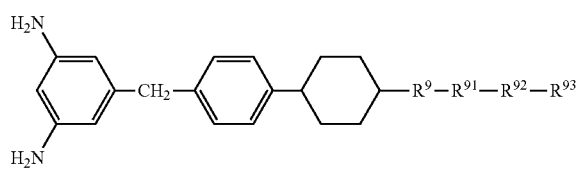
(ii-9)

wherein $R^9$ represents —O— or cyclohexylene; $R^{91}$ represents —CH$_2$—; $R^{92}$ represents phenylene or cyclohexylene; and $R^{93}$ represents hydrogen or heptyl,

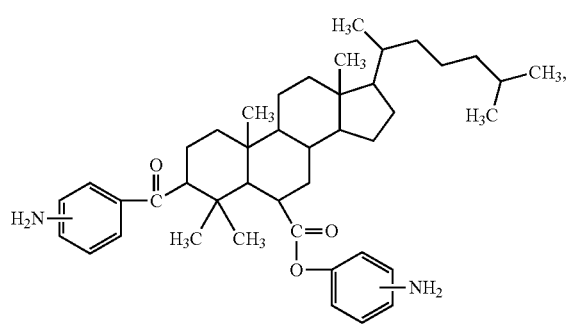
(ii-10)

(ii-11)

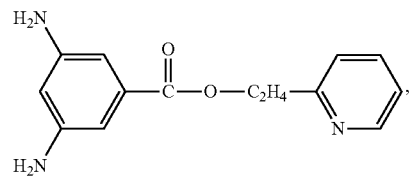
(ii-12)

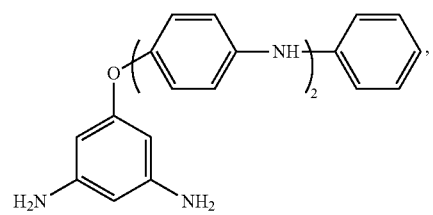
(ii-13)

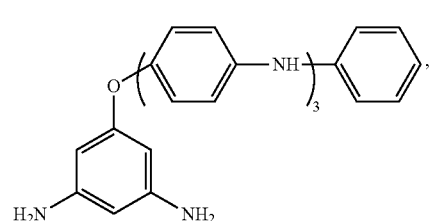
(ii-14)

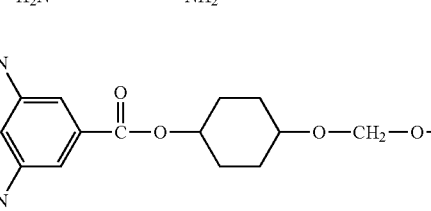
(ii-15)

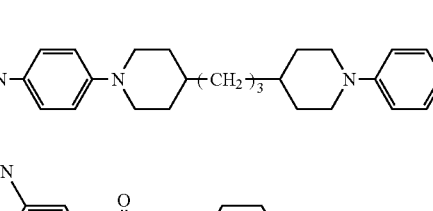
(ii-16)

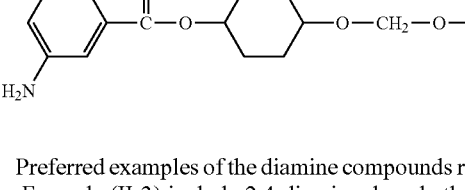
(ii-17)

Preferred examples of the diamine compounds represented by Formula (II-3) include 2,4-diaminophenyl ethyl formate, 3,5-diaminophenyl ethyl formate, 2,4-diaminophenyl propyl formate, 3,5-diaminophenyl propyl formate, 1-dodecoxy-2,4-aminobenzene, 1-hexadecoxy-2,4-aminobenzene, 1-octadecoxy-2,4-aminobenzene,

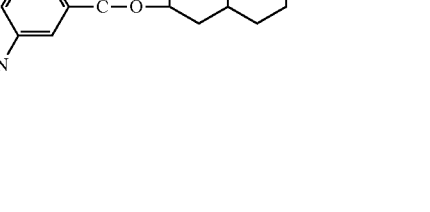
(ii-3-1)

-continued
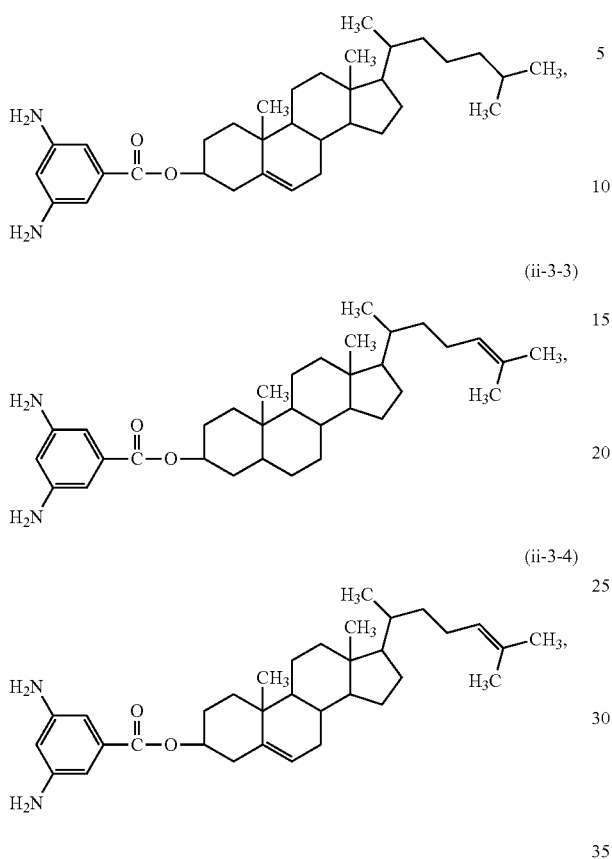
and the like.
Preferred examples of the diamine compounds represented by Formula (ii-4) include
-continued
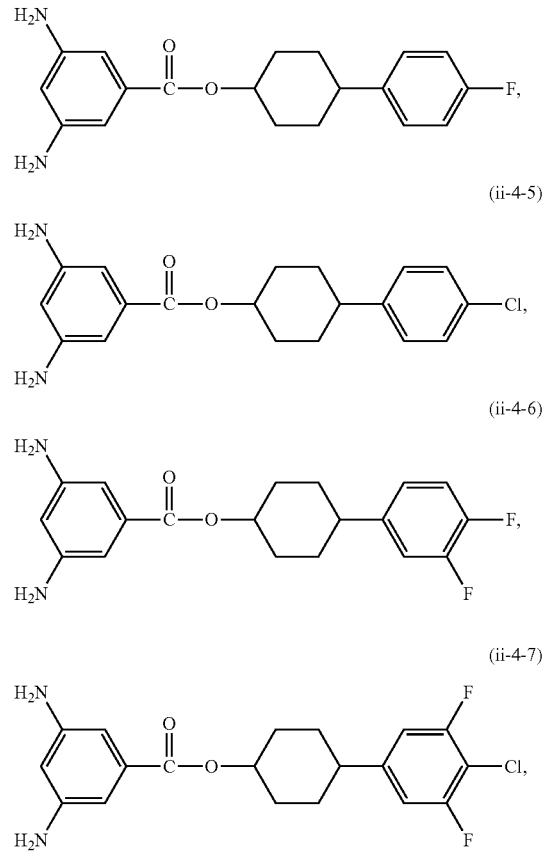
(wherein v represents an integer ranging from 3 to 12), (ii-4-11)

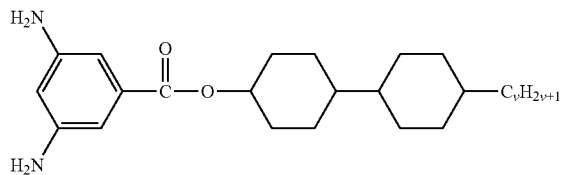

(wherein v represents an integer ranging from 3 to 12), (ii-4-12)

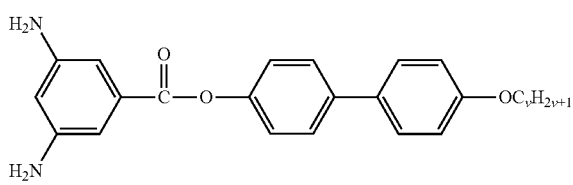

(wherein v represents an integer ranging from 3 to 12), and (ii-4-13)

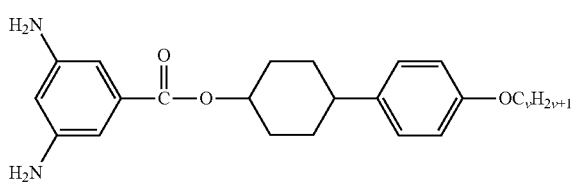

(wherein v represents an integer ranging from 3 to 12).

Preferred examples of the diamine compounds represented by Formula (ii-5) include: (1) p-diaminobenzene, m-diaminobenzene, o-diaminobenzene, 2,5-diaminotoluene, or the like when n is 1; (2) 4,4'-diaminobiphenyl, 2,2'-dimethyl-4,4'-diaminobiphenyl, 3,3'-dimethyl-4,4'-diaminobiphenyl, 3,3'-dimethoxy-4,4'-diaminobiphenyl, 2,2'-dichloro-4,4'-diaminobiphenyl, 3,3'-dichloro-4,4'-diaminobiphenyl, 2,2',5,5'-tetrachloro-4,4'-diaminobiphenyl, 2,2'-dichloro-4,4'-diamino-5,5'-dimethylbiphenyl, 4,4'-diamino-2,2'-bis(trifluoromethyl)biphenyl, or the like when n is 2; and (3) 1,4-bis(4'-aminophenyl)benzene, or the like when n is 3.

Preferably, the diamine compound represented by Formula (ii-7) is 4,4'-diaminodiphenylsulide.

Preferably, the diamine compound represented by Formula (ii-9) is selected from (ii-9-1)

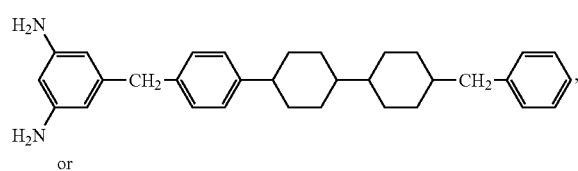

or (ii-9-2)

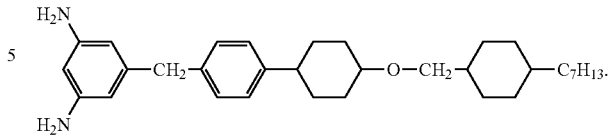

Preferred examples of the further diamine compound suitable for the present invention include, but are not limited to, 1,2-diaminoethane, 4,4'-diaminodicyclohexylmethane, 4,4'-diaminodiphenylmethane, 4,4'-diaminodiphenylether, 5-[4-(4-n-pentylcyclohexyl)cyclohexyl]phenylmethylene-1,3-diaminobenzene, 1,1-bis[4-(4-aminophenoxy)phenyl]-4-(4-ethylphenyl)cyclohexane, 2,4-diaminophenylformic acid ethyl ester, the diamine compounds represented by Formulae (ii-3-1), (ii-3-2), (ii-4-1), and (ii-4-11), p-diaminobenzene, m-diaminobenzene, o-diaminobenzene, and the diamine compound represented by Formula (ii-9-1).

Preferably, the diamine compound can be used in an amount ranging from 10 to 100 moles, and more preferably from 20 to 100 moles based on 100 moles of the diamine component.

Polysiloxane:

Polysiloxane containing the group $Z_2$ is obtained by reacting a bifunctional compound containing the group $Z_2$ and a group $A_1$ with a siloxane prepolymer containing a group $A_2$, wherein
$Z_2$ is as defined above,
$A_1$ is a monovalent group, and
$A_2$ is a monovalent group reactive with $A_1$ to undergo a reaction to form the polysiloxane.

Preferably, the group $Z_2$ is an epoxy-containing group, an isocyanato-containing group, or a carboxyl-containing group, the group $A_1$ is a hydroxyl-containing group, and the group $A_2$ is an alkoxy-containing group.

The group $Z_2$ is chosen according to the group $Z_1$, and the group $A_1$ is chosen according to the group $A_2$.

The equivalent ratio of the group $A_1$ to the group $A_2$ is in a range preferably from 0.01 to 0.5, and more preferably from 0.03 to 0.4. When the equivalent ratio of the group $A_1$ to the group $A_2$ is in the range defined above, the reactivity of the polysiloxane with the polymerization reaction product containing the group $Z_1$ can be enhanced, and the flexible substrate obtained thereafter has superior mechanical property.

Examples of the catalyst used for the reaction to obtain the polysiloxane include, but are not limited to, metals, such as lithium, sodium, potassium, rubidium, cesium, magnesium, calcium, barium, strontium, zinc, aluminum, titanium, cobalt, tin, lead, germanium, antimony, arsenic, cerium, boron, cadmium, manganese, or the like; halides of the aforesaid metals; oxides of the aforesaid metals; salts of the aforesaid metals; alkoxides of the aforesaid metals; and combinations thereof. Preferably, the catalyst is selected from salts of tin. Concrete examples of the catalyst include dibutyltin dilaurate and stannous octoate.

The reaction to obtain polysiloxane is conducted at a temperature ranging preferably from 50° C. to 150° C., and more preferably from 70° C. to 110° C. When the reaction to obtain polysiloxane is conducted at the temperature defined above, self-polymerization of siloxane prepolymer can be reduced, and the increase of the viscosity of the reaction medium, which may lead to inferior reactivity, can be avoided. The reaction to obtain polysiloxane is conducted for a period ranging preferably from 1 hour to 15 hours.

Bifunctional Compound:

Preferably, the bifunctional compound used in the present invention means that the compound has two kinds of functional groups, i.e., the group $Z_2$ and the group $A_1$. Examples of the bifunctional compound includes a hydroxyl-group-containing epoxy compound, a hydroxyl-group-containing isocyanate compound, and a hydroxyl-group-containing carboxylic acid compound. Examples of the hydroxyl-group-containing epoxy compound include, but are not limited to, (1) a glycidyl ether compound having a terminal hydroxyl group obtained by reacting epichlorohydrin, water, and dihydirc alcohol or dihydroxyphenol; (2) a polyglycidyl ether compound having a terminal hydroxyl group obtained by reacting epichlorohydrin with polyhydric alcohol (for example, glycerin, pentaerythritol, or the like); (3) an epoxy compound having a terminal hydroxyl group obtained by reacting epichlorohydrin with an amino alcohol compound; (4) a hydroxyl-group-containing alicyclic hydrocarbon epoxide; and (5) a hydroxyl-group-containing epoxy compound of Formula (VI),

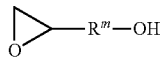  (VI)

wherein $R^m$ represents a $C_1$-$C_{13}$ alkylene group.

Concrete examples of the hydroxyl-group-containing epoxy compound include 4-hydroxyphenylglycidyl ether, 4-(hydroxymethyl)phenylglycidyl ether, 1,3-bis(glycidyloxy)-2-propanol, 2,2-bis(glycidyloxymethyl)-3-(glycidyloxy)-1-propanol, epoxidized tetrahydro benzyl alcohol, 2,3-epoxy-1-cyclohexanol, glycidol (for example, EPIOL OH manufactured by NOF Co., Ltd.), 8-oxiranyl-1-octanol, 9-oxiranyl-1-nonanol, EOA (manufactured by kuraray Co., Ltd.), and the like. The aforesaid concrete examples can be used alone or in combinations thereof.

Example of the hydroxyl-group-containing isocyanate compound includes, but are not limited to, a hydroxyl-group-containing isocyante compound of Formula (VII),

  (VII)

wherein $R^n$ represents a $C_2$-$C_{12}$ alkylene group.

Concrete examples of the hydroxyl-group-containing isocyanate compound include 2-hydroxyethyl isocyanate, 3-hydroxypropyl isocyanate, 4-hydroxybutyl isocyanate, 6-hydroxyhexyl isocyanate, 8-hydroxyoctyl isocyanate, 10-hydroxydecyl isocyanate, 12-hydroxydodecyl isocyanate, and the like. The aforesaid concrete examples can be used alone or in combinations thereof.

Examples of the hydroxyl-group-containing carboxylic acid compound include, but are not limited to hydroxyl-group-containing carboxylic acid compounds of Formulas (VIII) to (X),

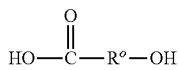  (VIII)

wherein $R^o$ represents a $C_1$-$C_{11}$ linear or branched alkylene group;

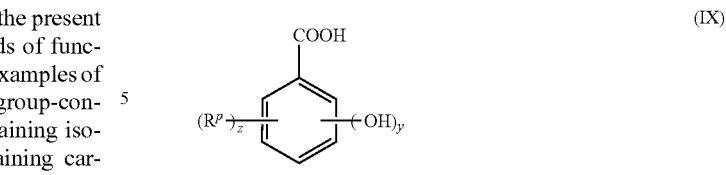  (IX)

wherein $R^p$ represents a $C_1$-$C_3$ alkyl group, y represents an integer ranging from 1 to 3, and z represents an integer ranging from 0 to 2;

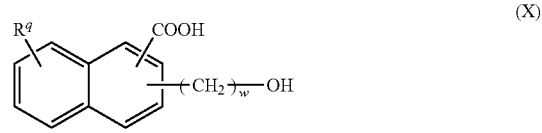  (X)

wherein $R^q$ represents hydrogen or methyl, and w is 0 or 1.

Concrete examples of the hydroxyl-group-containing carboxylic acid compound include hydroxyacetic acid, lactic acid, 2-hydroxybutyric acid, 2-hydroxy-2-methyl propanoic acid, 12-hydroxylauric acid, 3-hydroxybenzoic acid, 4-hydroxybenzoic acid, 2,4-dihydroxybenzoic acid, 2,5-dihydroxybenzoic acid, 2,6-dihydroxybenzoic acid, 3,5-dihydroxybenzoic acid, 2,4-dimethyl-6-hydroxybenzoic acid, 2,4-dihydroxy-6-propylbenzoic acid, salicylic acid, 3-methylsalicylic acid, 5-methylsalicylic acid, gallic acid, 1-hydroxy-2-naphthoic acid, 1-hydroxy-4-naphthoic acid, 1-hydroxy-5-naphthoic acid, 1-hydroxy-8-naphthoic acid, 2-hydroxy-1-naphthoic acid, 2-hydroxy-3-naphthoic acid, 2-hydroxy-6-naphthoic acid, 2-hydroxy-7-naphthoic acid, 4-hydroxymethyl-1-naphthoic acid, 8-hydroxymethyl-1-naphthoic acid, 1-hydroxy-6-methyl-2-naphthoic acid and the like. The aforesaid concrete examples can be used alone or in combinations thereof.

Preferable examples of the bifunctional compound include, but are not limited to, 4-hydroxyphenylglycidyl ether, glycidol, 8-oxiranyl-1-octanol, 2-hydroxyethyl isocyanate, 6-hydroxyhexyl isocyanate, 4-hydroxybenzoic acid, 2,4-dihydroxybenzoic acid, salicylic acid, 1-hydroxy-2-naphthoic acid.

Siloxane Prepolymer:

Siloxane prepolymer is obtained by subjecting silane monomer to hydrolysis followed by partial polycondensation. The silane monomer is preferably represented by Formula (XI):

  (XI)

wherein $R^r$ represents a $C_1$-$C_8$ alkyl group or a $C_6$-$C_8$ aryl group;

m represents 0 or 1; and $R^s$ represents a $C_1$-$C_4$ alkyl group, and may be the same or different when 4-m is 3 or 4.

When m is 0, the silane monomer is tetrafunctional siloxane, such as tetramethoxysilane, tetraethoxysilane, tetrapropoxysilane, tetra-1-propoxysilane, or the like. When m is 1, the silane monomer is trifunctional siloxane, such as methyltrimethoxysilane, methyltriethoxysilane, methyltripropoxysilane, methyltributoxysilane, ethyltrimethoxysilane, ethyltriethoxysilane, propyltrimethoxysilane, propyltriethoxysilane, i-propyltrimethoxysilane, i-propyltriethoxysilane, or the like. The aforesaid examples of the silane monomer may be used alone or in admixture of two or more.

Hydrolysis and partial condensation can be implemented in a general manner. For example, the silane monomer is added with solvent, water, and optional catalyst, followed by a heating treatment to obtain the siloxane prepolymer. The solvent and the catalyst are not specifically limited. The number average molecular weight of the siloxane prepolymer is preferably from 230 to 2,000. The average number of silicon atoms in each siloxane prepolymer molecule is preferably from 2 to 11. The group $A_2$ contained in the siloxane prepolymer is in an amount ranging preferably from 50 moles to 95 moles, and more preferably from 60 moles to 90 moles, based on 100 moles of the siloxane prepolymer.

Flexible Substrate and Preparation Thereof:

A flexible substrate can be formed from the polysiloxane-grafted polyimide resin composition of the present invention. Specifically, the polysiloxane-grafted polyimide resin composition of the present invention can be applied on a substrate board followed by drying and curing the resin composition to form the flexible substrate on the substrate board. The flexible substrate is then removed from the substrate board.

The polysiloxane-grafted polyimide resin composition of the present invention can be applied on the substrate using a coating method commonly used in the art, such as spin coating, cast coating, roll coating, or the like.

Drying can be implemented in a manner well known in the art so as to remove the solvent. Drying is implemented at a drying temperature from 50° C. to 200° C. for a period ranging from 1 minute to 1 hour.

Curing can be implemented in a manner well known in the art so as to conduct sol-gel curing of alkoxysilyl and to remove residual solvent. Curing is implemented at a curing temperature from 150° C. to 500° C. for a period ranging from 10 minutes to 2 hours.

The flexible substrate can be removed from the substrate board in a manner well known in the art, for example, stripping, dry-etching, wet-etching, or the like.

Examples of the substrate board suitable for the present invention include, but are not limited to, alkali-free glass, soda-lime glass, Pyres glass, quartz glass, and silicon wafer.

The thermal expansion coefficient of the flexible substrate is preferably not greater than 30 ppm/° C. The flexible substrate formed from the polysiloxane-grafted polyimide resin composition of the present invention is useful on a substrate of a flexible liquid crystal display or an electronic book.

The following examples are provided to illustrate the preferred embodiments of the invention, and should not be construed as limiting the scope of the invention.

EXAMPLES

Preparation of Polysiloxane

Preparation Example 1

A 500 ml three-necked conical flask equipped with a nitrogen inlet and a stirrer was purged with nitrogen, and was added with glycidol (commercially available as EPIOL OH manufactured by NOF Co., Ltd., 1420 g) and tetramethoxysilane partial condensate (commercially available as M Silicate 51 manufactured by Tama Chemical Co., Ltd., 9000 g), followed by continuous stirring and heating to 90° C. Dibutyltin dilaurate (2 g) was then added. The contents of the flask were cooled to room temperature after about 620 g of methanol was distillated out. About 100 g of methanol was further removed via distillation under a reduced pressure of 13 kPa to obtain polysiloxane. The equivalent ratio of the epoxy group of glycidol to the methoxy group of the tetramethoxysilane partial condensate is 0.11.

Preparation Example 2

A 500 ml three-necked conical flask equipped with a nitrogen inlet and a stirrer was purged with nitrogen, and was added with glycidol (commercially available as EPIOL OH, manufactured by NOF Co., Ltd., 1420 g) and methyltrimethoxysilane partial condensate (commercially available as MTMS-B, manufactured by Tama Chemical Co., Ltd., 9000 g), followed by continuous stirring and heating to 90° C. Dibutyltin dilaurate (1.8 g) was then added. The contents of the flask were cooled to room temperature after about 630 g of methanol was distillated out. About 30 g of methanol was further removed via distillation under a reduced pressure of 13 kPa to obtain polysiloxane. The equivalent ratio of the epoxy group of glycidol to the methoxy group of the methyltrimethoxysilane partial condensate is 0.06.

Preparation Example 3

A 500 ml three-necked conical flask equipped with a nitrogen inlet and a stirrer was purged with nitrogen, and was added with 2-hydroxyethylisocyanate (1757 g) and tetramethoxysilane partial condensate (commercially available as M Silicate 51 manufactured by Tama Chemical Co., Ltd., 4520 g), followed by continuous stirring and heating to 90° C. Dibutyltin dilaurate (1.2 g) was then added. The contents of the flask were cooled to room temperature after about 590 g of methanol was distillated out. About 25 g of methanol was further removed via distillation under a reduced pressure of 13 kPa to obtain isocyanate-containing polysiloxane. The equivalent ratio of the hydroxyl group of the 2-hydroxyethylisocyanate to the methoxy group of the tetramethoxysilane partial condensate is 0.21.

Preparation Example 4

A 500 ml three-necked conical flask equipped with a nitrogen inlet and a stirrer was purged with nitrogen, and was added with 4-hydroxybenzoic acid (2623 g) and methyltrimethoxysilane partial condensate (commercially available as MTMS-A manufactured by Tama Chemical Co., Ltd., 3380 g), followed by continuous stirring and heating to 90° C. Dibutyltin dilaurate (2.1 g) was then added. The contents of the flask were cooled to room temperature after about 620 g of methanol was distillated out. About 32 g of methanol was further removed via distillation under a reduced pressure of 13 kPa to obtain carboxyl-containing polysiloxane. The equivalent ratio of the hydroxyl group of the 4-hydroxybenzoic acid to the methoxy group of the methyltrimethoxysilane partial condensate is 0.36.

Preparation of Polysiloxane-Grafted Polyimide Resin:

Example 1

A 500 ml four-necked conical flask equipped with a nitrogen inlet, a stirrer, a heater, a condenser, and a thermometer was purged with nitrogen, and was added with 2,3,5-tricarboxylcyclopentylacetic dianhydride (112.2 g, 0.5 mole), and N-methylpyrrolidone (700 g). α,ω-di(3-aminopropyl)polydimethylsiloxane (commercially available as KF-8010 manufactured by Shin-Etsu Chemical Co., Ltd., 43.53 g, 0.05 mole) was then slowly added at a temperature below 100° C. After 2 hours of ring-opening reaction at 100° C., the flask was cooled to room temperature followed by addition of 3,3'-dihydroxyl-4,4'-diaminobiphenyl (86.5 g, 0.4 mole), 4,4'-diaminodiphenylether (10 g, 0.05 mole), and N-methylpyrrolidone (300 g) to react at room temperature for 6 hours. N-methylpyrrolidone (900 g), acetic anhydride (56.5 g), and pyridine (195.5 g) were then added, followed by stirring at 60° C. for 4 hours so as to obtain a polymerization reaction product containing hydroxyl group.

The obtained polymerization reaction product was heated to 90° C., followed by adding with polysiloxane produced in Preparation Example 1 (40 g) and 2-methylimidazole (0.25 g). Reaction was conducted at 80° C. for 6 hours, followed by cooling to room temperature to obtain a polysiloxane-grafted polyimide resin. By nuclear magnetic resonance (NMR), the product contains 90% of the polysiloxane-grafted polyimide resin of Formula (I).

Examples 2 to 9 and Comparative Examples 1 to 6

Examples 2 to 9 and Comparative Examples 1 to 6 were conducted in a manner identical to Example 1 using the components and the reaction conditions shown in Table 1 to prepare polysiloxane-grafted polyimide resins. The amounts of the polysiloxane-grafted polyimide resin of Formula (I) of the Examples 2 to 9 and Comparative Examples 1 to 6 are measured by the same manner. The results are shown in Table 1.

TABLE 1

| Components | | Examples | | | | | | | | | Comparative Examples | | | | | |
|---|---|---|---|---|---|---|---|---|---|---|---|---|---|---|---|---|
| | | 1 | 2 | 3 | 4 | 5 | 6 | 7 | 8 | 9 | 1 | 2 | 3 | 4 | 5 | 6 |
| Tetracarboxylic dianhydride components (moles) | a-1 | 0.5 | — | — | 0.2 | — | 0.2 | — | — | 0.5 | 0.5 | — | — | 0.2 | — | 0.5 |
| | a-2 | — | 0.5 | 0.5 | — | 0.4 | 0.3 | 0.5 | — | — | — | 0.5 | 0.5 | — | 0.4 | — |
| | a-3 | — | — | — | 0.3 | 0.1 | — | — | 0.5 | — | — | — | — | 0.3 | 0.1 | — |
| siloxane components (moles) | b-1 | 0.05 | — | — | 0.1 | 0.02 | — | — | — | 0.08 | 0.05 | — | — | 0.1 | — | — |
| | b-2 | — | 0.05 | — | — | 0.02 | 0.05 | — | 0.05 | — | — | — | — | — | — | — |
| | b-3 | — | — | 0.1 | — | — | — | 0.06 | 0.03 | — | — | — | 0.1 | — | — | — |
| Ring-opening reaction | Temp (° C.) | 100 | 100 | 110 | 100 | 100 | 110 | 105 | 100 | 110 | 100 | — | 110 | 100 | — | — |
| | Time (hr) | 2 | 2 | 3 | 3 | 2 | 2 | 2 | 3 | 3 | 2 | — | 2 | 3 | — | — |
| Diamine components (moles) | c-1-1 | 0.4 | — | — | 0.2 | — | — | — | — | 0.02 | — | — | — | — | — | — |
| | c-1-2 | — | 0.45 | — | 0.2 | — | 0.3 | 0.1 | — | — | — | — | — | — | — | — |
| | c-1-3 | — | — | 0.5 | — | — | — | 0.3 | — | 0.2 | — | — | 0.1 | — | — | — |
| | c-1-4 | — | — | — | — | 0.4 | — | — | 0.4 | — | — | — | — | — | 0.4 | — |
| | c-2-1 | 0.05 | — | — | — | — | 0.15 | — | — | — | 0.05 | 0.45 | 0.3 | 0.4 | — | 0.5 |
| | c-2-2 | — | — | — | — | 0.05 | — | — | — | 0.2 | 0.4 | — | — | — | 0.1 | — |
| Dehydration/ring-closure reaction | Temp (° C.) | 60 | 50 | 70 | 60 | 55 | 50 | 60 | 50 | 60 | 60 | 50 | 70 | 60 | 55 | 60 |
| | Time (hr) | 4 | 4 | 5 | 5 | 3 | 3 | 3 | 4 | 4 | 4 | 4 | 5 | 5 | 3 | 4 |
| Polysiloxane (g) | Prep. Ex. 1 | 40 | 40 | — | — | — | — | — | — | — | 40 | 40 | — | — | — | — |
| | Prep. Ex. 2 | — | — | 30 | — | — | — | — | — | 40 | — | — | — | — | — | — |
| | Prep. Ex. 3 | — | — | — | 40 | 30 | 40 | — | — | — | — | — | — | — | — | — |
| | Prep. Ex. 4 | — | — | — | — | — | — | 40 | 40 | — | — | — | — | — | — | — |
| Equivalent ratio of group $A_1$/group $A_2$ | | 0.11 | 0.11 | 0.06 | 0.21 | 0.21 | 0.21 | 0.36 | 0.36 | 0.06 | 0.11 | 0.11 | — | — | — | — |
| The amount of polysiloxane-grafted polyimide resin of Formula (I) (wt %) | | 90 | 80 | 97 | 92 | 78 | 70 | 85 | 80 | 90 | 0 | 0 | 0 | 0 | 0 | 0 |
| The amount of silicon of the polysiloxane-grafted polyimide resin of Formula (I) (mole) | | 10.1 | 11.8 | 13.5 | 10.3 | 10.6 | 7.6 | 5.8 | 6.1 | 6.8 | 0 | 0 | 0 | 0 | 0 | 0 | a-1: 2,3,5-tricarboxylcyclopentylacetic dianhydride;
a-2: pyromellitic dianhydride;
a-3: 1,2,3,4-cyclobutanetetracarboxylic dianhydride;
b-1: α,ω-di(3-aminopropyl)polydimethylsiloxane(commercially available as KF-8010 manufactured by Shin-Etsu Chemical Co., Ltd.);
b-2: α,ω-di(3-hydroxylpropyl)polydimethylsiloxane(commercially available as DK X8-8579-4 manufactured by Dow Corning Asia);
b-3: an equimolar reaction product of α,ω-di(3-hydroxylpropyl)polydimethylsiloxane and p-phenylene diisocyanate;
c-1-1: 3,3'-dihydroxy-4,4'-diaminobiphenyl;
c-1-2: 2-hydroxy-p-diaminobenzene;

TABLE 1-continued

| Com- | Examples | | | | | | | | | Comparative Examples | | | | | |
|---|---|---|---|---|---|---|---|---|---|---|---|---|---|---|---|
| ponents | 1 | 2 | 3 | 4 | 5 | 6 | 7 | 8 | 9 | 1 | 2 | 3 | 4 | 5 | 6 | c-1-3: 3,3'-dicarboxyl-4,4'-diaminobiphenyl;
c-1-4: 2,5-dicarboxyl-p-diaminobenzene;
c-2-1: 4,4'-diaminodiphenylether;
c-2-2: p-diaminobenzene Preparation of Flexible Substrate:

Application Example 1

The siloxane-grafted polyimide resin obtained in Example 1 (100 parts by weight) and ethylene glycol n-butylether (800 parts by weight) were mixed to obtain a polysiloxane-grafted polyimide resin composition.

The polysiloxane-grafted polyimide resin composition was applied on a glass substrate board of 100 mm×100 mm×0.7 mm by spin coating to form a film on the substrate board. The film was dried at 110° C. for 2 minutes and was then baked at 220° C. for 30 minutes to obtain a substrate body including a flexible substrate disposed on the glass substrate board. The substrate board was evaluated according to the following evaluation methods. The results are shown in Table 2.

Application Examples 2 to 10 and Comparative Application Examples 1 to 6

Application Examples 2 to 10 and Comparative Application Examples 1 to 6 were conducted in a manner identical to Application Example 1 using the components and the amounts thereof shown in Table 2 to obtain the flexible substrates. The flexible substrates thus obtained were evaluated according to the following evaluation methods. The results are shown in Table 2.

[Evaluated Items]
1. Thermal expansion coefficient ($\alpha$):

The thermal expansion coefficient ($\alpha$, ppm/° C.) at a temperature from 100° C. to 200° C. of the flexible substrates of each of the substrate bodies obtained in Application Examples 1 to 10 and Comparative Application Examples 1 to 6 was determined using a thermo mechanical analyzer (manufactured by Seiko, Model No. TMA120C), and was evaluated as follows.

⊚: $\alpha < 25$;
○: $30 > \alpha \geq 25$;
△: $40 > \alpha \geq 30$;
X: $\alpha \geq 40$.

2. Tensile Breaking Strength ($\sigma$):

The tensile breaking strength ($\sigma$, GPa) of the flexible substrates of each of the substrate bodies obtained in Application Examples 1 to 10 and Comparative Application Examples 1 to 6 was determined three times at room temperature using a tensile strength tester (manufactured by Orientech, Model No. UCT-500, tensile speed: 50 mm/min). An average tensile breaking strength of each of the flexible substrates was evaluated as follows.

○: $0.15 < \sigma \leq 0.2$;
△: $0.1 < \sigma \leq 0.15$;
X: $\sigma \leq 0.1$.

TABLE 2

| Components (Parts by weight) | | Application Examples | | | | | | | | | |
|---|---|---|---|---|---|---|---|---|---|---|---|
| | | 1 | 2 | 3 | 4 | 5 | 6 | 7 | 8 | 9 | 10 |
| Ex. | 1 | 100 | — | — | — | — | 70 | — | — | — | — |
| | 2 | — | 100 | — | — | — | — | — | — | — | — |
| | 3 | — | — | 100 | — | — | 30 | — | — | — | — |
| | 4 | — | — | — | 100 | — | — | — | — | — | — |
| | 5 | — | — | — | — | 100 | — | — | — | — | — |
| | 6 | — | — | — | — | — | — | 100 | — | — | — |
| | 7 | — | — | — | — | — | — | — | 100 | — | — |
| | 8 | — | — | — | — | — | — | — | — | 100 | — |
| | 9 | — | — | — | — | — | — | — | — | — | 100 |
| Comp. Ex. | 1 | — | — | — | — | — | — | — | — | — | — |
| | 2 | — | — | — | — | — | — | — | — | — | — |
| | 3 | — | — | — | — | — | — | — | — | — | — |
| | 4 | — | — | — | — | — | — | — | — | — | — |
| | 5 | — | — | — | — | — | — | — | — | — | — |
| | 6 | — | — | — | — | — | — | — | — | — | — |
| Solvents | 1-1 | 800 | 700 | — | — | 1000 | 400 | 600 | 750 | — | — |
| | 1-2 | — | — | 800 | 650 | — | 600 | — | — | 850 | — |
| | 1-3 | — | — | — | — | — | — | 250 | — | — | 800 |
| Additives | 2-1 | — | — | — | 8 | — | 15 | — | — | — | — |
| | 2-2 | — | 5 | — | — | 2 | — | — | — | — | — |
| | 2-3 | — | — | — | — | 3 | — | — | — | — | — |
| Evaluation Results | $\alpha$ | ○ | ○ | ○ | ⊚ | ○ | ○ | ○ | X | X | X |
| | $\sigma$ | ○ | ○ | ○ | ○ | ○ | ○ | ○ | X | X | X |

| Components (Parts by weight) | | Comparative Application Examples | | | | | |
|---|---|---|---|---|---|---|---|
| | | 1 | 2 | 3 | 4 | 5 | 6 |
| Ex. | 1 | — | — | — | — | — | — |
| | 2 | — | — | — | — | — | — |

TABLE 2-continued

|  |  | Comp. Ex. 1 | Comp. Ex. 2 | Comp. Ex. 3 | Comp. Ex. 4 | Comp. Ex. 5 | Comp. Ex. 6 |
|---|---|---|---|---|---|---|---|
|  | 3 | — | — | — | — | — | — |
|  | 4 | — | — | — | — | — | — |
|  | 5 | — | — | — | — | — | — |
|  | 6 | — | — | — | — | — | — |
|  | 7 | — | — | — | — | — | — |
|  | 8 | — | — | — | — | — | — |
|  | 9 | — | — | — | — | — | — |
| Comp. Ex. | 1 | 100 | — | — | — | — | — |
|  | 2 | — | 100 | — | — | — | — |
|  | 3 | — | — | 100 | — | — | — |
|  | 4 | — | — | — | 100 | — | — |
|  | 5 | — | — | — | — | 100 | — |
|  | 6 | — | — | — | — | — | 100 |
| Solvents | 1-1 | 800 | 800 | — | 700 | — | — |
|  | 1-2 | — | — | 800 | — | 800 | 650 |
|  | 1-3 | — | — | — | — | — | — |
| Additives | 2-1 | — | — | — | — | — | 8 |
|  | 2-2 | — | — | 5 | — | — | — |
|  | 2-3 | — | — | — | — | — | — |
| Evaluation Results | α | X | X | X | X | X | X |
|  | σ | X | X | X | X | X | X |

α: thermal expansion coefficient
σ: tensile breaking strength
1-1: ethylene glycol n-butyl ether
1-2: N-methyl-2-pyrrolidone
2-1: filler IPA-ST (silicon dioxide, particle size: 12 nm, manufactured by Nissan Chemical)
2-2: adhesion promoter KBM-403 (manufactured by Shin-Etsu Chemical Co., Ltd.)
2-3: antioxidant BHT (manufactured by TCI)

As shown in Table 2, in Application Examples 1 to 10, the flexible substrates obtained from the polyimide resin composition which contains the polysiloxane-grafted polyimide resin of Formula (I) have superior thermal expansion coefficient and tensile breaking strength.

However, in Comparative Application Examples 1 to 6, the flexible substrates obtained from the polyimide resin compositions which do not contain the polysiloxane-grafted polyimide resin of Formula (I) have inferior thermal expansion coefficient and tensile breaking strength. Specifically, Comparative Application Example 1 is as disclosed in JP-2005146213.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A polysiloxane-grafted polyimide resin composition comprising:
a polysiloxane-grafted polyimide resin of Formula (I):

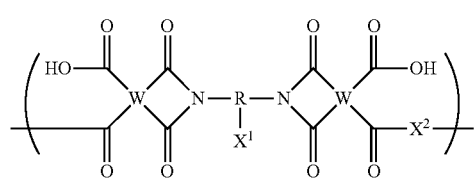

wherein
W represents a tetravalent organic group,
R represents a trivalent organic group, and
$X^1$ and $X^2$ independently represent a polysiloxane-containing group;
and
a solvent.

2. The polysiloxane-grafted polyimide resin composition as claimed in claim 1, wherein $X^1$ is selected from

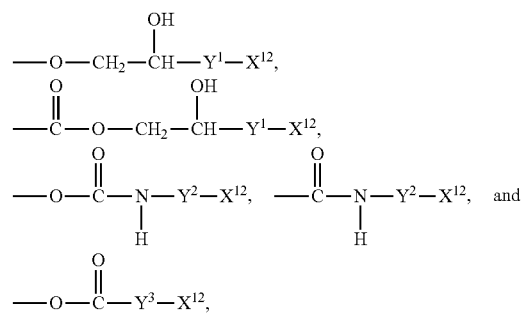

wherein
$X^{12}$ represents a polysiloxanyl group,
$Y^1$ and $Y^3$ independently represent a substituted or unsubstituted $C_1$-$C_{13}$ alkylene group, a substituted or unsubstituted $C_6$-$C_{12}$ arylene group, or a substituted or unsubstituted $C_7$-$C_{12}$ aralkylene group, and
$Y^2$ represents a substituted or unsubstituted $C_1$-$C_{13}$ alkylene group, wherein part of methylene groups of said alkylene group is optionally replaced by oxygen atoms with the proviso that when more methylene groups are replaced by oxygen atoms, a structure in which two oxygen atoms adjoin together is excluded.

3. The polysiloxane-grafted polyimide resin composition as claimed in claim 1, wherein $X^2$ is selected from

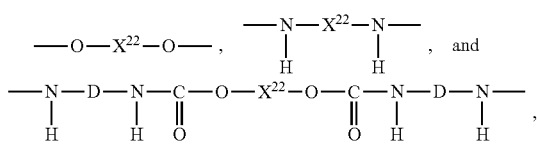

wherein $X^{22}$ represents a polysiloxanyl group, and

D represents

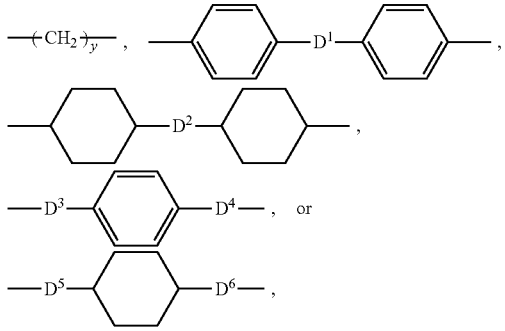

wherein y is an integer ranging from 1 to 10, and $D^1, D^2, D^3, D^4, D^5$, and $D^6$ independently represent a single bond or a $C_1$-$C_2$ linear alkylene group.

4. The polysiloxane-grafted polyimide resin composition as claimed in claim 1, wherein said trivalent organic group is selected from the group consisting of a trivalent aliphatic group, a trivalent alicyclic group, a trivalent aromatic group, and combinations thereof.

5. The polysiloxane-grafted polyimide resin composition as claimed in claim 1, wherein said polysiloxane-containing group has a silicon content ranging from 0.045 mole to 36 moles based on 1 mole of said polysiloxane-grafted polyimide resin.

6. The polysiloxane-grafted polyimide resin composition as claimed in claim 1, wherein said polysiloxane-grafted polyimide resin is obtained by a process including the steps of:

(a) subjecting a tetracarboxylic dianhydride component of formula

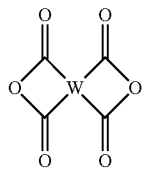

and a siloxane component to a ring-opening reaction, wherein

W is as defined in claim 1;

(b) adding a diamine component including a diamine compound of formula

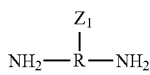

to conduct a polymerization reaction followed by a dehydration/ring-closure reaction to form a polymerization reaction product of formula

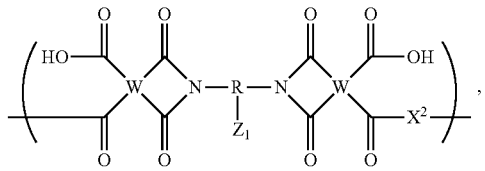

wherein

W, R, and $X^2$ are as defined in claim 1, and $Z_1$ is a monovalent group; and (c) subjecting said polymerization reaction product and polysiloxane containing a group $Z_2$ to a reaction to produce said polysiloxane-grafted polyimide resin, wherein $X^2$ is as defined in claim 1, and $Z_2$ is a monovalent group reactive with $Z_1$ to undergo said reaction.

7. The polysiloxane-grafted polyimide resin composition as claimed in claim 6, wherein said siloxane component is selected from the group consisting of a siloxane compound containing a terminal hydroxyl group, a siloxane compound containing a terminal amino group, a siloxane compound containing a terminal isocyanato group, and combinations thereof.

8. The polysiloxane-grafted polyimide resin composition as claimed in claim 6, wherein said polysiloxane is obtained by reacting a bifunctional compound containing said group $Z_2$ and a group $A_1$ with a siloxane prepolymer containing a group $A_2$, wherein $Z_2$ is as defined in claim 6, $A_1$ is a first active group, and $A_2$ is a second active group reactive with $A_1$ to undergo a reaction to form said polysiloxane.

9. The polysiloxane-grafted polyimide resin composition as claimed in claim 8, wherein an equivalent ratio of $A_1$ to $A_2$ is in a range from 0.01 to 0.5.

10. The polysiloxane-grafted polyimide resin composition as claimed in claim 8, wherein said bifunctional compound is selected from the group consisting of a hydroxyl-group-containing epoxy compound, a hydroxyl-group-containing isocyanate compound, a hydroxyl-group-containing carboxylic acid compound, and combinations thereof.

11. The polysiloxane-grafted polyimide resin composition as claimed in claim 1, further comprising a polysiloxane-grafted polyamic acid resin of Formula (II)

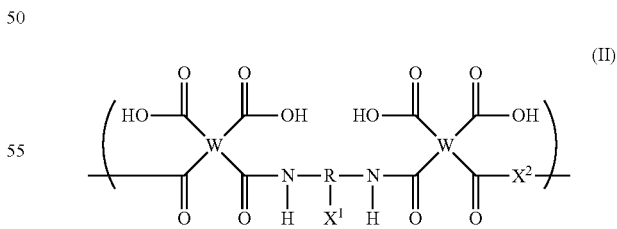

(II)

wherein

W, R, $X^1$, and $X^2$ are as defined in claim 1.

12. The polysiloxane-grafted polyimide resin composition as claimed in claim 11, wherein said polysiloxane-grafted polyimide resin is in an amount not less than 70 wt % based on 100 wt % of a combination of said polysiloxane-grafted polyimide resin and said polysiloxane-grafted polyamic acid resin.

13. The polysiloxane-grafted polyimide resin composition as claimed in claim 1, further comprising a filler.

14. A flexible substrate formed from the polysiloxane-grafted polyimide resin composition as claimed in claim 1.

15. The flexible substrate as claimed in claim 14, which has a thermal expansion coefficient not greater than 30 ppm/° C.

* * * * *